United States Patent [19]

Berkowitz

[11] Patent Number: 5,175,556
[45] Date of Patent: Dec. 29, 1992

[54] SPACECRAFT ANTENNA PATTERN CONTROL SYSTEM

[75] Inventor: Milton Berkowitz, King of Prussia, Pa.

[73] Assignee: General Electric Company, Philadelphia, Pa.

[21] Appl. No.: 711,854

[22] Filed: Jun. 7, 1991

[51] Int. Cl.$^5$ .......................................... H04B 7/185
[52] U.S. Cl. ................................................. 342/354
[58] Field of Search ............. 342/354, 355, 356, 358, 342/352

[56] References Cited

U.S. PATENT DOCUMENTS 3,531,803 9/1970 Rosen et al.
4,599,619 7/1986 Keigler et al. ............... 342/352
4,883,244 11/1989 Challoner et al. ............ 342/354

Primary Examiner—Theodore M. Blum
Attorney, Agent, or Firm—Geoffrey H. Krauss

[57] ABSTRACT

A system for controlling a radiation pattern of an antenna array carried on a spacecraft, to provide and maintain a desired pattern over a preselected area remote from the spacecraft, without physical movement of the array with respect to the spacecraft even if the spacecraft is physically reoriented with respect to the remote earth area, uses sensors, carried on the spacecraft, for determining spacecraft reorientation relative to the preselected earth area, so as to provide at least one error signal responsive to any spacecraft reorientation; a phased-array antenna system, inertialessly reconfigures the array radiation pattern responsive to a set of directional pointing data; a loop provides the directional pointing data in a manner serving to minimize the error signals from the sensing means and thus cause the antenna radiation pattern to remain substantially fixed on the remote earth area even if the spacecraft is reoriented.

10 Claims, 1 Drawing Sheet

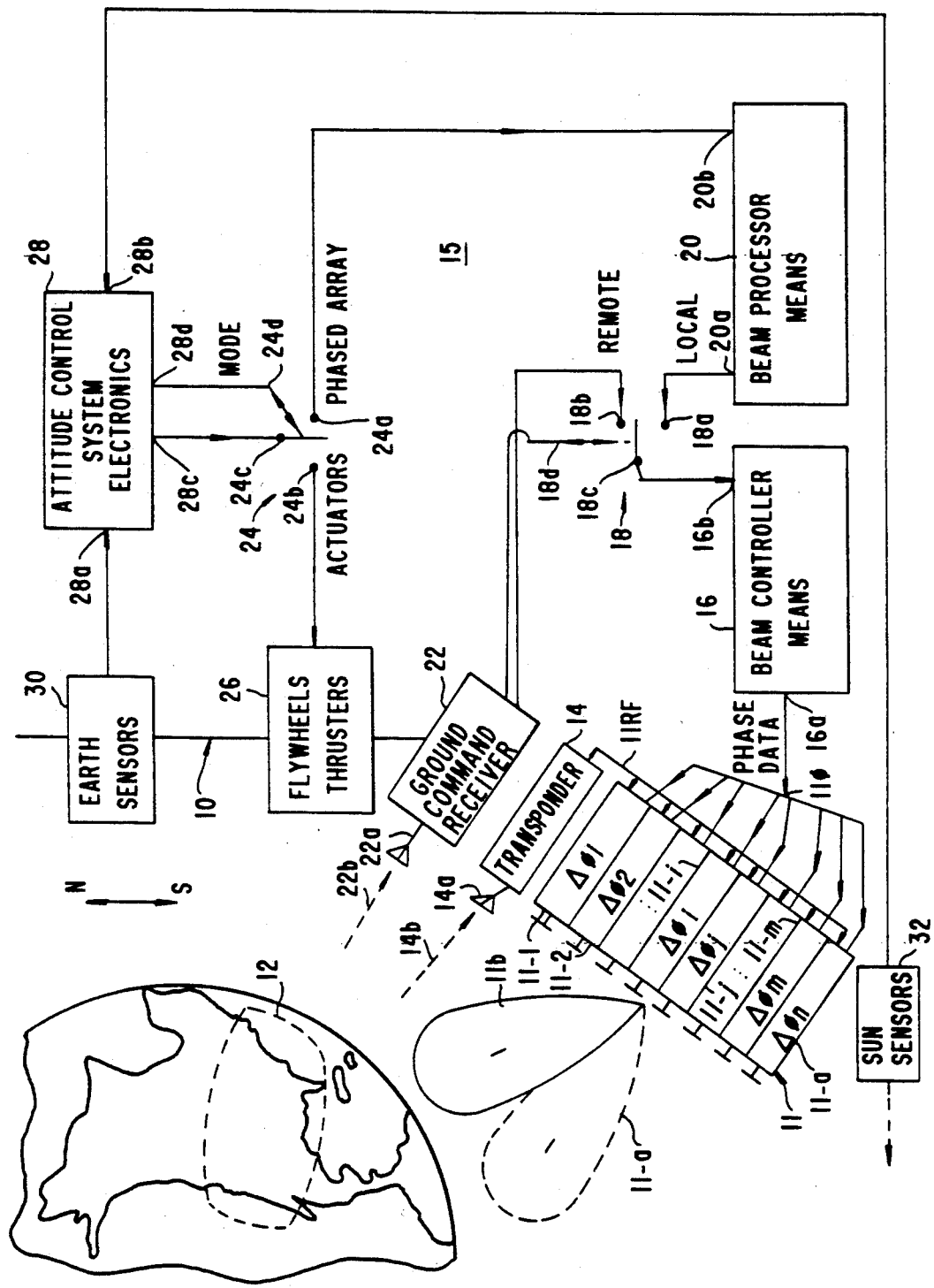

SPACECRAFT ANTENNA PATTERN CONTROL SYSTEM

The present invention relates to geosynchronous communication satellites and, more particularly, to a novel locally-closed-loop system for electrically adjusting the reconfigurable pattern of at least one spacecraft communications antenna to precisely point at a particular remote target area, even if the spacecraft is reoriented with respect to that target area.

BACKGROUND OF THE INVENTION

It is now well known to utilize communications satellites placed in geosynchronous orbit about the Earth's equator, to relay radio signal transmissions from one point to another on the Earth. It is also well known to provide various mechanical means which keep the satellite antenna coverage patterns each aligned with a specific predetermined area of the earth, especially if the communication antenna patterns are deliberately shaped and pointed so as to fit as closely as possible a predetermined area of the earth's surface to be served by that satellite. Many forms of systems for controlling the pointing of the spacecraft antennas have been hitherto suggested, such as the one described by I. Brown in U.S. Pat. No. 4,630,058, issued Dec. 16, 1986 and incorporated herein in its entirely by reference. Brown teaches reception of at least one satellite-originated signal by at least one ground station located about the periphery of a desired communications antenna radiation pattern coverage area on the earth, so as to provide a sense signal which can be sent back to the satellite, via a remote control loop, to cause mechanical control of the satellite attitude and so move the antenna pattern to compensate for any signal decrease in the coverage area. However, movement of the entire spacecraft, by any of a plurality of inertial techniques (i.e. resulting in actual mechanical movement of the spacecraft with respect to a three-dimensional, earth-based coordinate system) depletes the stored energy of the satellite. In most modern communication satellites using fixed-pattern antennas, a three-axis attitude control system (ACS) is provided to precisely point the antennas at the desired communication coverage region on earth; the ACS typically uses earth and sun sensors for attitude sensing and utilizes inertial means (reaction wheels to correct relatively small attitude errors and hydrazine propulsion for larger errors and orbit station keeping) with a typical accuracy requirement of 0.1 degrees in roll, pitch and yaw and ±0.1 degrees for orbital positioning. These stringent requirements increase the amount of propulsion fuel required for the attitude thrusters and so, for a satellite carrying a fixed amount of fuel, lead to both decreased mission life and increased ground support logistics for on-orbit operation management. For a commercial communications satellite, increased fuel use is a decrease in useful life and increased economic loss. It is therefore highly desirable to provide a new means for moving a spacecraft antenna radiation pattern to continually compensate for the spacecraft motion and/or orbital drift, and keep the antenna pattern precisely pointed at a desired earth area remote from the craft.

BRIEF SUMMARY OF THE INVENTION

In accordance with the invention, a system for controlling a radiation pattern of an antenna array of a plurality of elements, all carried on a spacecraft, to provide and maintain a desired pattern over a preselected area remote from the spacecraft, without physical movement of the array with respect to the spacecraft even if the spacecraft is physically reoriented with respect to the remote earth area, uses sensors, carried on the spacecraft, for determining spacecraft reorientation relative to the preselected earth area, so as to provide at least one error signal responsive to any spacecraft reorientation; electronic means, such as a phased-array antenna system, for inertialessly reconfiguring the array radiation pattern responsive to a set of directional pointing data; and local loop means for providing the directional pointing data in a manner serving to minimize the error signals from the sensing means and thus cause the antenna radiation pattern to remain substantially fixed on the remote earth area even if the spacecraft is reoriented. Reorientation by spacecraft motion or orbital drift is correctable by reconfiguring (changing) the antenna pattern, with respect to the spacecraft, over an angle lying within some cone of maximum reorientation angles. Inertial means may be provided for shifting the entire spacecraft to provide gross reorientation through angles larger than the greatest inertialess steering angle of the phased array antennas. By so electronically adjusting the antenna pattern, instead of inertially moving the spacecraft, the specified antenna "footprint" on earth can be more readily maintained over a larger range of spacecraft attitude and orbital movements.

In the presently preferred embodiment, a phased array antenna is used, with a beam controller which is also responsive to commands received from a remote location, such as a ground command station, so that correction for orbital drift, normally measured by use of ground tracking systems, can be commanded to the beam controller for direct implementation and thus reduce the relatively large fuel consumption normally required to correct for north-south (transequatorial) drift.

Accordingly, it is an object of the present invention to provide a novel spacecraft antenna pattern control system in which local loop control is utilized for the inertialess reconfiguration of an antenna array radiation pattern to cause the pattern to be maintained over a preselected area remote from the spacecraft even if the spacecraft is physically reoriented with respect to that remote area.

This and other objects of the present invention will now become apparent to those skilled in the art upon reading the following detailed description, when considering conjunction with the associated drawing.

BRIEF DESCRIPTION OF THE DRAWING

The sole FIGURE is a schematic block diagram of a spacecraft having an antenna pattern control system in accordance with the present invention, and of the spacecraft relationship with a preselected coverage area upon the earth.

DETAILED DESCRIPTION OF THE INVENTION

Referring now to the sole FIGURE, a portion of a spacecraft 10 carries at least one communication antenna means 11, which has a radiation pattern 11a which may be reconfigurably patterned (i.e. steered) to any angle $\alpha$ within a cone of angles given by a maximum steerage angle $\alpha_{max}$, with respect to a normal to the array surface, so as to provide an actual antenna radiation pattern 11b which is directed at a desired remote area 12, such as the continental United States (CONUS) upon the earth. By use of a phased array antenna with a plurality of channels, or elements, 11-1 to 11-n, each receiving individual phase-setting data and utilized with a common RF signal line 11 RF, both the pattern and the direction of reconfigurable beam 11b can be established. As illustrated, the geosynchronous satellite has a transponder 14 with its own antenna 14a for receiving signals 14b from ground stations (not shown) and for providing a received signal on antenna input bus 11 RF. The beam 11b radiation angle is established by the individual phase delays $\Delta\phi_i$, for each of the $1 \leq i \leq n$ array channels, responsive to the individual channel phase data provided at a data port 11$\phi$, for an output 16a of a beam controller means 16. Beam controller means 16 cooperates with the array phase shifters for inertialessly reconfiguring the antenna radiation pattern with respect to the physical spacecraft. Thus, the beam controller means will convert signals at a beam controller means input 16b to output phase data implementing an input 16b actuator control command. The actuator control input signal is provided from local or remote sources by action of a first switching means 18, receiving a local signal at a first selectable terminal 18a and receiving a remote-originated control signal at a second selectable terminal 18b, for selectable connection to a common terminal 18c (coupled to the beam controller means input 16b) responsive to the state of a selection signal at a selection input 18d.

The local actuation control signals are provided at the output 20a of a beam processing means 20 which receives ACS error signals at an input 20b thereof, and provides any necessary signal processing to convert the ACS output signal format to the required format for actuation control signals at beam controller input 16b. The ACS output signals for the phased array appear at a first selectable terminal 24a of a second switching means 24, having a second selectable terminal 24b providing ACS signals to an inertial correction system 26. The ACS output signal is provided to a second switching means common terminal 24c, which is selectably connected to first or second selectably terminals 24a/24b responsive to the state of a mode selection signal at a mode switch input 24d. An attitude control system electronics means 28 has a first input 28a receiving the output signal from at least one earth sensing means 30 and has a second input 28b receiving the output signal from at least one sun sensing means 32. Responsive to the output signals from sensors 30 and 32, attitude control system electronics means 28 calculates the ACS output signal, containing pointing error information, and provides that signal from means output 28c to second switching means common terminal 24c. As long as the pointing signal magnitude corresponds to an error offset angle $\alpha$ less than the phased array steering angle $\alpha_{max}$, means 28 provides a signal at an auxiliary output 28d which is at a first binary logic level, causing switching means 24 to connect common terminal 24c to the phased array selectable terminal 24a, so that the local-closed-loop system continually reconfigures (steers) the array radiation pattern to compensate for spacecraft motion and maintain the desired pattern over the preselected earth area 12. In the event that the sensors detect a spacecraft reorientation of magnitude greater than the maximum steerable cone angle, the remaining binary signal condition is provided at output 28d, to cause switching means 24 to actuate and connect common switch terminal 24c to switch terminal 24b and inertially change the spacecraft position to compensate for the large motional change previously experienced. It will be seen that, because the inertial control system is only utilized for gross changes, with finger changes being electrically accommodated in the inertialess local-closed-loop reconfigurable antenna array system 15, the amount of energy lost in the inertial system is decreased, allowing the spacecraft to remain on station for a longer time interval, due to the reduced fuel consumption required.

The local-closed-loop system 15 may be temporarily defected, by operation of switch 18 responsive to a control signal provided at an output 22a of a ground control receiver means 22, so as to provide ground control data, provided at another output 22b to the remote terminal 18b of first switching means 18. The ground control data is provided responsive to signals 22c received at the ground command receiver antenna 22d, in manner well known to the art. Use of remote control allows for correction of orbital drift by the normal system of measuring such drift by ground tracking system and commanding corrections to the spacecraft. As shown, the orbital drift is illustrated as being of sufficiently low magnitude as to be corrected by entering a steering bias angle into the beam controller means 16, which bias angle is continuously implemented in the phased array, to correct for north-south drift. While not illustrated, it is possible to reconfigure the ACS for connection of the orbital drift correction information to the ACS electronics means 28, for inertial correction in manner well known to the satellite control arts.

While a presently preferred embodiment of my novel spacecraft antenna pattern control system is shown and described in some detail herein, many variations and modifications will now become apparent to those skilled in the art. In particular, it will be seen that the system is equally applicable to transmit and receive antennas and can be utilized with a number of transmit and/or receiving antenna arrays simultaneously, even where each array is directed at a different remote area 12 of interest. Accordingly, I intend to be limited only by the scope of the appending claims and not by the specific details and instrumentalities presented by way of description herein.

What I claim is:

1. A system for controlling a radiation pattern of an antenna array of a plurality of elements, all carried on a spacecraft, to provide and maintain a desired pattern over a preselected area remote from said spacecraft, without physical movement of the array with respect to the spacecraft even if the spacecraft is physically reoriented with respect to the remote area, comprising:

means carried on said spacecraft for sensing spacecraft reorientation relative to the preselected area, to provide at least one error signal responsive to any sensed reorientation;

means for inertialessly reconfigurating the array radiation pattern responsive to a set of directional pointing data; and local loop means for providing said directional pointing data so as to minimize the at least one error signal from said sensing means to cause said array radiation pattern to remain substantially fixed on the remote area even if said spacecraft is reoriented.

2. The system of claim 1, wherein said antenna array pattern is electronically steered.

3. The system of claim 2, wherein said local loop means includes means for varying a parameter of the signal applied to each element of the antenna array responsive to an associated datum of the directional pointing data set, to cause the array pattern to spatially move.

4. The system of claim 3, wherein the parameter is phase and each element of said array has a variable phase shifter operatively coupled thereto and individually controlled by an associated directional pointing data set datum.

5. The system of claim 1, wherein said sensing means further includes means for receiving remotely-originated commands to redirect the array pattern.

6. The system of claim 1, wherein said spacecraft also contains: ACS means for stabilizing the spacecraft along a plurality of axes; and means for enabling the ACS stabilizing means to move the radiation pattern if the magnitude of the error signal exceeds a predetermined value.

7. The system of claim 6, wherein the ACS means is a 3-axis stabilizing subsystem.

8. The system of claim 6, wherein the ACS means includes: rotational members; and reactive means for propelling the spacecraft.

9. The system of claim 1, wherein the spacecraft is a geosynchronous satellite.

10. The system of claim 9, wherein the sensing means senses north-south drift of the satellite, and said drift is corrected by action of said local loop means.

* * * * *